United States Patent
Heimerdinger et al.

[19]

[11] Patent Number: 6,036,464

[45] Date of Patent: Mar. 14, 2000

[54] HEAT BLANKET BUFFER ASSEMBLY

[75] Inventors: Maro W. Heimerdinger, Torrance, Calif.; Jerome J. Connolly, Dalworthington Gardens, Tex.

[73] Assignee: Northrop Grumman Corporation, Los Angeles, Calif.

[21] Appl. No.: 09/078,792

[22] Filed: May 14, 1998

Related U.S. Application Data

[63] Continuation-in-part of application No. 08/516,350, Aug. 18, 1995, Pat. No. 5,753,271.

[51] Int. Cl.[7] .............................. B29C 73/34; B32B 35/00
[52] U.S. Cl. .......................... 425/11; 29/402.11; 156/94; 156/98
[58] Field of Search ............................... 156/94, 98, 285; 264/36.18, 36.22; 425/11; 29/402.01, 402.09, 402.11

[56] References Cited

U.S. PATENT DOCUMENTS

| | | | |
|---|---|---|---|
| 4,560,428 | 12/1985 | Sherrick et al. | 156/94 |
| 4,567,076 | 1/1986 | Therrien | 428/102 |
| 4,767,656 | 8/1988 | Chee et al. | 428/116 |
| 4,793,879 | 12/1988 | Mimbs | 156/98 |
| 4,808,253 | 2/1989 | Mimbs | 156/98 |
| 4,888,247 | 12/1989 | Zweben et al. | 428/105 |
| 4,961,799 | 10/1990 | Cologna et al. | 156/92 |
| 4,978,404 | 12/1990 | Westerman, Jr. | 156/98 |
| 5,023,987 | 6/1991 | Wuepper et al. | 29/402.11 |
| 5,050,595 | 9/1991 | Krafft | 128/379 |
| 5,260,124 | 11/1993 | Gaier | 428/257 |
| 5,316,080 | 5/1994 | Banks et al. | 165/185 |
| 5,442,156 | 8/1995 | Westerman et al. | 219/243 |
| 5,753,271 | 5/1998 | Heimerdinger | 156/94 |

*Primary Examiner*—Daniel Stemmer
*Attorney, Agent, or Firm*—Terry Anderson; Karl J. Hoch, Jr.

[57] ABSTRACT

An apparatus and method is disclosed using a blanket (50) which is an assembly of at least one graphite fiber element of high thermal conductivity and at least one metal sheet element such as a copper sheet element to repair an aircraft structure (10) made of composite fiber materials. The blanket (50) is placed in thermal contact with a silicone rubber heat blanket (22), having an internal heat source, and the aircraft structure, such as composite laminates (12, 14). Use of the blanket (50) increases the rate at which the temperature of the laminates can be elevated to the proper range for repair and transfers heat from hot spots to cold spots to ensure a uniform temperature throughout the laminates.

20 Claims, 3 Drawing Sheets

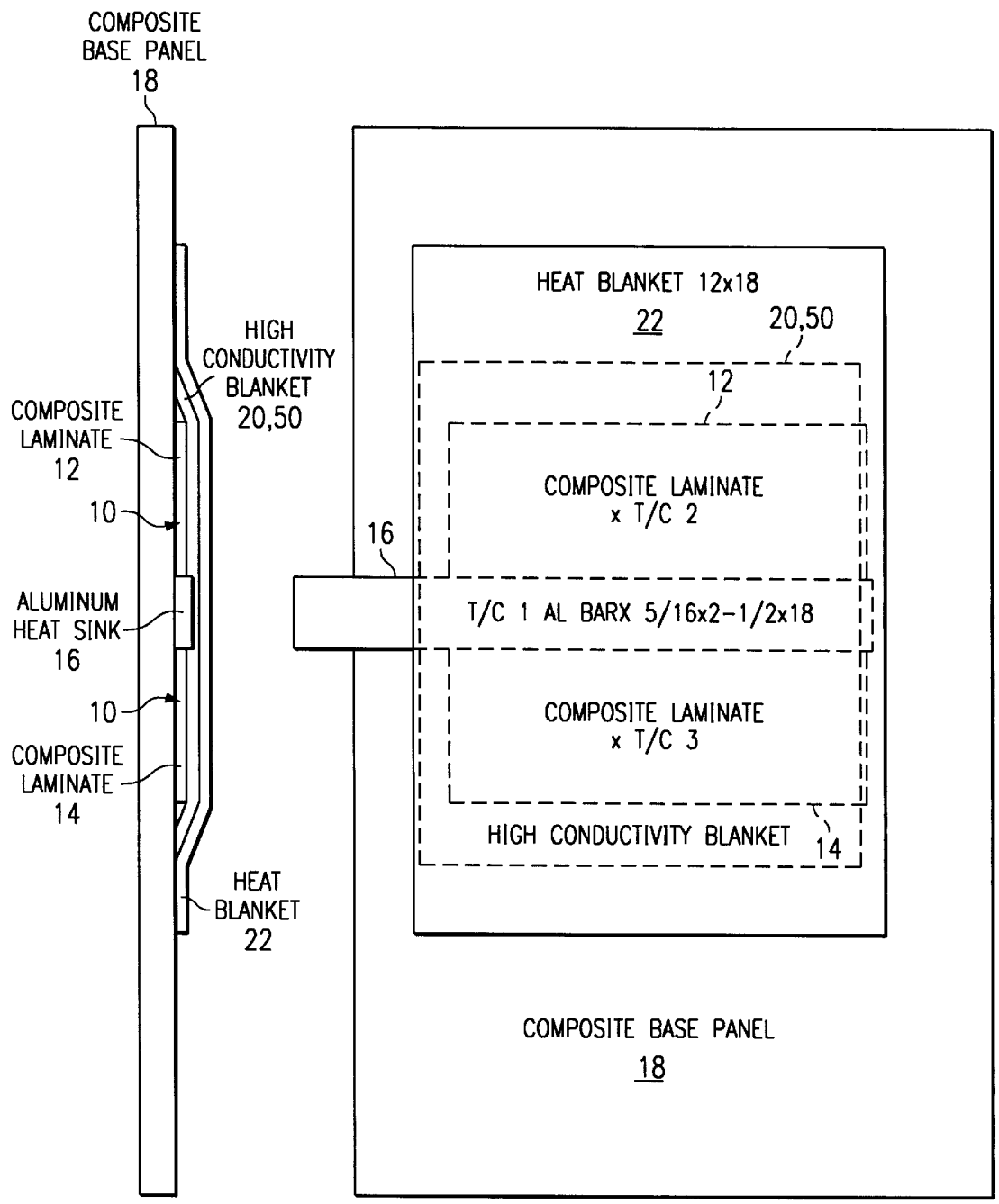

HEAT BLANKET BUFFER ASSEMBLY

CROSS REFERENCE TO RELATED APPLICATIONS

This is a continuation-in-part of U.S. patent application Ser. No. 08/516,350 filed Aug. 18, 1995, now U.S. Pat. No. 5,753,271.

GOVERNMENT LICENSE RIGHTS

The U.S. Government has a paid-up license in this invention and the right in limited circumstances to require the patent owner to license others on reasonable terms as provided for by the terms of contract No. F33615-95-C-5617 awarded by the U.S. Air Force.

TECHNICAL FIELD OF THE INVENTION

This invention relates to the repair of aircraft structures.

BACKGROUND OF THE INVENTION

Aircraft structure formed of carbon fiber composite laminates are becoming more common, particularly in high performance military aircraft. These materials replace the traditional materials, such as aluminum, from which aircraft structures have traditionally been made.

One of the advantages of the use of carbon fiber materials is the ease of repair should the aircraft structure become damaged, as by an accident such as a tool or the like damaging the surface or even combat related damage. The repair can be performed by providing sufficient bonding resins and carbon fiber material to the place of repair and bonding the carbon fibers with heat to cure the bonding materials.

In performing such repairs, it is desirable to maintain the temperature of the aircraft structure being repaired at a precise, and uniform temperature consistent with the curing requirements of the bonding material. In the past, it has been common to use a silicone rubber heat blanket with heater wires distributed therethrough to heat the aircraft structure to a desired temperature. However, because of integral heat sinks and nonuniform structure in the aircraft assemblies, it has been difficult to achieve a uniform temperature distribution. A need exists for an apparatus and method to provide a more uniform heat distribution to provide a uniform temperature for the repair.

SUMMARY OF THE INVENTION

In accordance with one aspect of the present invention, an apparatus is provided for repairing an aircraft structure which is repairable with the use of heat. The apparatus includes a heat source and a blanket of at least one graphite fiber element and at least one thin flexible metal sheet element, such as a copper sheet element, with the blanket in thermal contact with the heat source and the aircraft structure. The blanket of graphite fiber and copper sheet elements delivers heat to the aircraft structure and ensures a uniform temperature at the aircraft structure for repair. In accordance with another aspect of the present invention, a silicone rubber heat blanket is provided in thermal contact with the blanket of graphite fiber and copper sheet elements.

In accordance with another aspect of the present invention, a method is provided for repairing an aircraft structure which is repairable with the use of heat, including the step of placing a blanket of at least one graphite fiber element and at least one metal sheet element such as a copper sheet element in thermal contact with the aircraft structure to be repaired and placing a heat source in thermal contact with the blanket of the graphite fiber and copper sheet elements. The method further includes a step of heating the aircraft structure with heat from the heat source distributed uniformly by the blanket of graphite fiber and copper sheet elements to provide a uniform temperature in the aircraft structure for repair. A further aspect of the method is the placement of a silicone rubber heat blanket in thermal contact with the blanket of the graphite fiber and copper sheet elements. The copper sheet element provides a thermal mass that, in conjunction with the high conductivity graphite fiber, provides uniform temperature in the aircraft structure for repair.

BRIEF DESCRIPTION OF THE DRAWINGS

For a more complete understanding of the present invention and the advantages thereof, reference is now made to the following description, taken in conjunction with the accompanying drawings, in which:

FIG. 1 is a side cross-sectional view of an apparatus constructed in accordance with the teachings of a first embodiment of the present invention used to uniformly heat an aircraft structure;

FIG. 2 is a plan view of the apparatus of FIG. 1;

DETAILED DESCRIPTION OF THE INVENTION

Figure 3:
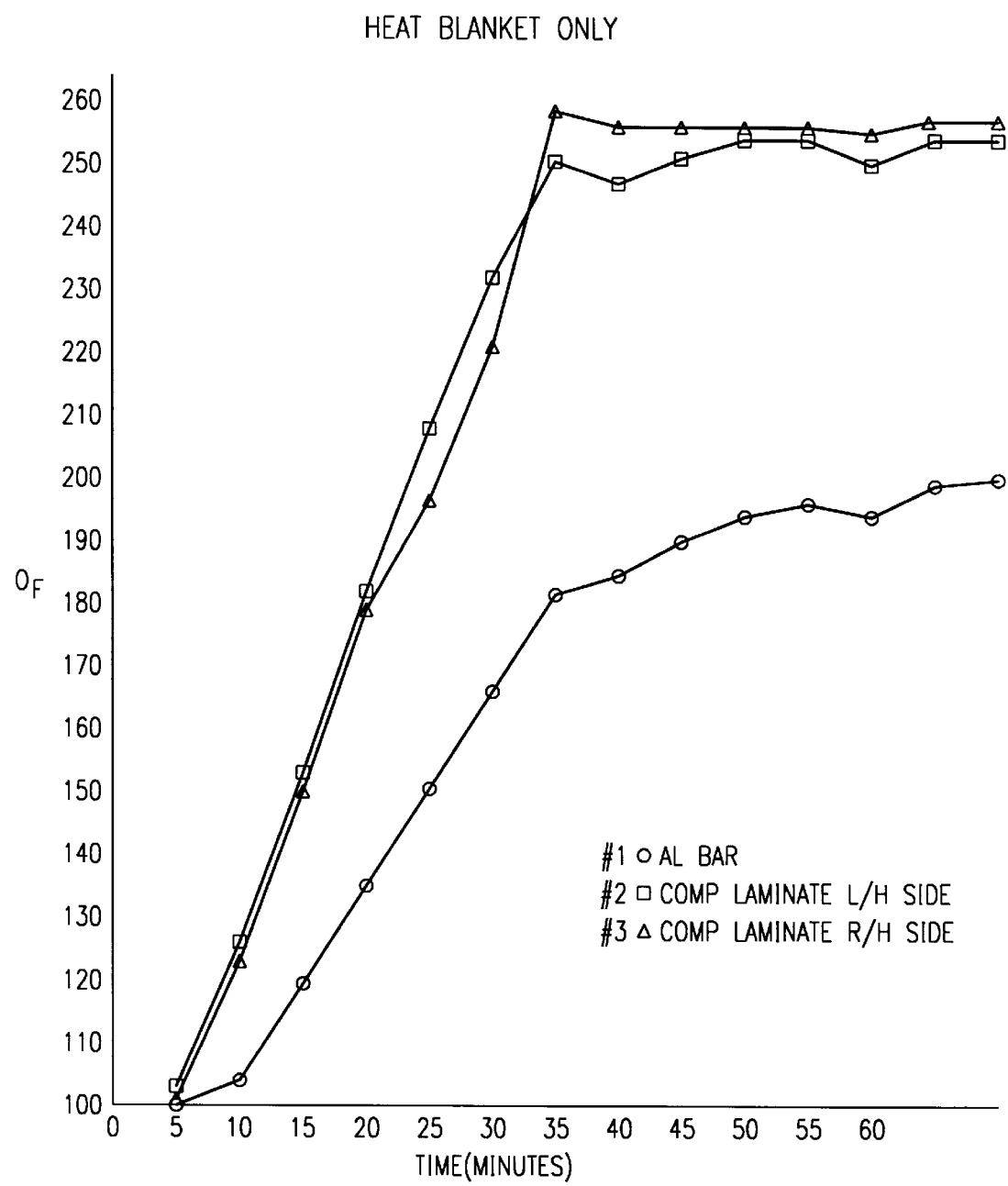
FIG. 3 is a graph illustrating the temperature distribution in an aircraft structure using a prior art apparatus.

With reference now to the accompanying figures and the following detailed description, an apparatus and method for uniformly heating an aircraft structure 10 to provide a uniform temperature in this structure for repairing the structure is disclosed.

In FIGS. 1 and 2, the aircraft structure 10 includes a left hand composite laminate 12 and a right hand composite laminate 14 separated by an aluminum heat sink 16. The laminates 12 and 14 and heat sink 16 rest on a composite base panel 18. However, it will be understood that the present invention need not use a heat sink 16 and the laminate or laminates being repaired can be of any configuration.

Lying atop the laminates 12 and 14 and heat sink 16 is a graphite fiber blanket 20 having highly conductive pitch graphite fibers. Lying atop the blanket 20 is a silicone rubber heat blanket 22. Blanket 22 is of the type commonly known in the industry that contains heater wires therein through which current can pass to provide heat to perform a repair on the laminates 12 and 14.

Figure 4:
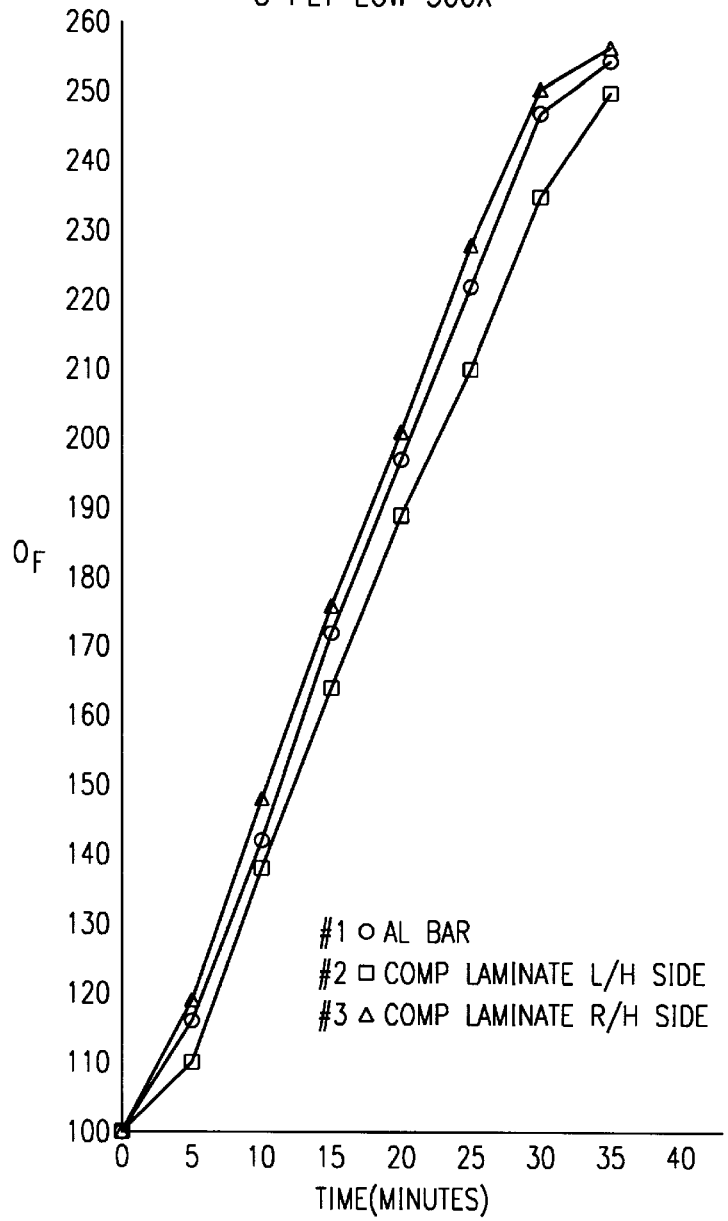
FIG. 4 is a graph of the temperature distribution in an aircraft structure with the apparatus of FIG. 1 using blanket 20.

In the absence of the graphite fiber blanket 20, as the laminates 12 and 14 are heated by the heat blanket 22, the temperature distribution in the laminates and aluminum heat sink will vary considerably with time, as seen in FIG. 3. However, by use of the graphite fiber blanket 20, the temperature distribution between the aluminum bar heat sink 16 and the laminates 12 and 14 and within the laminates is much more uniform, as seen in FIG. 4, providing a much more uniform temperature throughout the laminates. In addition, the temperature rise of the entire aircraft structure is much quicker, providing for a faster and more uniform bonding of the repair material to the aircraft structure. The graphite fiber blanket transfers heat from hot spots to cold spots and assists in maintaining uniform temperature with resulting improved repair patch integrity. Of course, after the repair is completed, the blanket 20 and silicone rubber heat blanket 22 are removed.

The graphite fiber blanket 20 utilized is formed of the type of material discussed in U.S. Pat. No. 5,316,080, which patent is incorporated herein by reference in its entirety, which has a very high thermal conductivity, exceeding even that of copper. The thermal conductivity of the fibers can be, for example, about three times that of copper.

One graphite fiber blanket 20 found usable in the process of the present invention is manufactured by AMOCO Performance Products, Inc. as Thermalgraph™ fabric under the trademark Thornel®. Both the Thermalgraph™ fabric EWC-300X and the Thermalgraph™ fabric EWC-500X have been found suitable. The test illustrated in FIG. 4 was with EWC-300X fabric. These materials are pitch fiber based high thermal conductivity woven fabrics. Due to the orthotopic nature of the weave and the high longitudinal thermal conductivity of the fibers, biaxial thermal conductivity is achieved. The EWC-300X is a plain weave fabric constructed from four-thousand filament continuous pitch tows. EWC-500X is available as an eight harness satin weave fabric constructed from two-thousand filament continuous pitch tows. The EWC-300X material has a count (warp and fill) of 11×10 tows per inch and a weight of 599 g per square meter. The fabric electrical resistivity (warp and fill) is 0.05 Ω/sq. The density is 2.1 g per cubic centimeter and the yarn electrical resistivity is 4.0–5.0 micro ohm meters. The estimated thermal conductivity is 200–300 W/m° K. The EWC-500X material has a count (warp and fill) of 20×20 tows per inch and a weight of 485 g per square meter. The thickness is 0.61 mm and the resistivity is 0.03 Ω/sq. The density is 2.15 g per cubic centimeter and the yarn electrical resistivity is 2.3 to 2.8 micro ohm meters. The estimated thermal conductivity is 400–500 W/m° K.

In the preferred embodiment, a three-ply graphite fiber blanket 20 is formed composed of three plies of the EWC-300X material stitched together.

In the assembly illustrated in FIGS. 1 and 2, the silicone rubber heat blanket 22 is a rectangle of 12 inches by 18 inches. The aluminum heat sink is a bar 5/16 inch thick by 2½ inches wide by 18 inches long.

With reference to FIGS. 1–5, a modified blanket 50 will be described which incorporates graphite fiber such as used in blanket 20 and metal sheet. The blanket 50 is used in the same manner as blanket 20, as illustrated in FIGS. 1 and 2 and is a substitute for blanket 20. The blanket 50 can be used in the repair of aircraft structures of composites or metals. The metal sheet can be copper, silver, platinum or other high thermal density materials.

Figure 5:
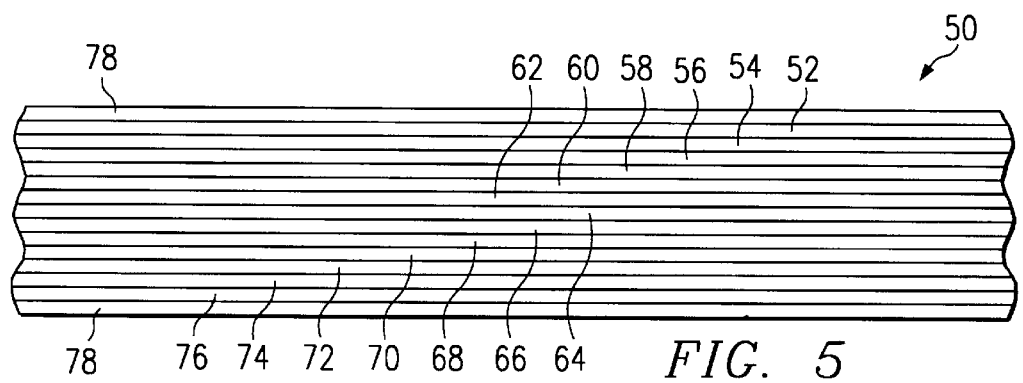
FIG. 5 is a cross sectional view of a modified blanket forming a first modification

With reference to FIG. 5, one blanket 50 constructed in accordance with the teachings of the present invention is shown with the blanket 50 constructed with two sheets 52 and 54 of copper 0.016 inches thick (16 mils), a single-ply sheet 56 of graphite fiber of thickness about 0.010 inches (10 mils), two sheets 58 and 60 of copper 0.016 inches thick, a three-ply sheet 62 of graphite fiber of thickness about 0.030 inches (30 mils), two sheets 64 and 66 of copper sheet 0.016 inches thick, a three-ply sheet 68 of graphite fiber of thickness about 0.030 inches (30 mils), a single sheet 70 of copper sheet 0.016 inches thick, a three-ply sheet 72 of graphite fiber of thickness about 0.030 inches (30 mils), and two sheets 74 and 76 of copper sheet 0.016 inches thick. The blanket is encased within a Teflon (polytetrafluoroethylene) cover 78 having a thickness of 5 mils (0.005 inches).

The use of a metal in sheet form, such as copper, silver, platinum or other high thermal density material, provides the advantage of combining a relatively high thermal mass that, in conjunction with the high conductivity graphite fiber, provides uniform temperature in the aircraft structure for repair. The metal, such as copper, can have various forms. For example, it can be sheet (generally considered to be of thickness 0.010 inches or more), foil (generally considered to be of thickness less than 0.010 inches), braid, or mesh. For purposes of the application, including the claims, sheet will refer collectively to sheet, foil, braid or mesh. The metal, such as copper, not only acts to distribute thermal energy, but also as a thermal storage medium as a reservoir of thermal energy.

The metal sheet will preferably have sufficient thickness to add to the performance of the blanket 50, but will not be so thick as to be too heavy or inflexible as many of the structures to be repaired have a curvature and it is desirable for the blanket 50 to conform to the surface of the structure being repaired. For copper, it is expected that a range of thickness between about 0.008 inches (8 mils) and about 0.020 inches (20 mils) would be satisfactory. Of course, if the surface of the structure to be repaired is flat, flexibility of blanket 50 is not critical and the thickness of the metal sheets can be any thickness desired.

It is preferable to encase the modified blanket 50 within a Teflon (polytetrafluoroethylene) cover 78. The Teflon (polytetrafluoroethylene) does not bond to the resins used in the repair and is capable of withstanding the temperature of repair, typically 350 to 500° F. If a Kapton (polyimide resin in the form of a film) cover is used in substitution for Teflon (polytetrafluoroethylene) cover 78, repair temperatures up to about 700° can be employed. The three-ply graphite fiber material is preferably stitched together in the Z (thickness) direction.

Any number of layers of graphite fiber and metal sheet can be used. The sheets of the blanket 50, such as sheets 52–78, can be secured together at a single center tie point for ease of handling but are preferably not otherwise secured together.

Although a single embodiment of the invention has been illustrated and described with numerous specific details in the forgoing description and accompanying drawings, it will be understood that the invention is not limited to the embodiment disclosed, but is capable of numerous rearrangements, modifications and substitutions of parts and elements without department from the spirit and scope of the invention.

We claim:

1. An apparatus for repairing an aircraft structure repairable with the use of heat, comprising:
    a heat source,
    a blanket of at least one graphite fiber element and at least one metal sheet element, the blanket in thermal contact with the heat source and the aircraft structure, the blanket of at least one graphite fiber element and at least one metal sheet element ensuring a uniform temperature in the aircraft structure for repair.

2. The apparatus of claim 1, wherein the heat source includes a silicone rubber heat blanket in thermal contact with the blanket of the said at least one graphite fiber and said at least one metal sheet element.

3. The apparatus of claim 1, wherein the graphite fiber element has a thermal conductivity of between about 200–500 W/m° K.

4. The apparatus of claim 1, further comprising a metal heat sink in thermal contact with the aircraft structure and the blanket.

5. The apparatus of claim 1 wherein the metal sheet element is a copper sheet element.

6. The apparatus of claim 5 wherein the copper sheet element has a thickness within the range of about 0.008 inches to about 0.020 inches.

7. The apparatus of claim 1 wherein the metal sheet element is a silver sheet element.

8. The apparatus of claim 1 wherein the metal sheet element is a platinum sheet element.

9. The apparatus of claim 1 wherein the metal sheet element is a foil.

10. The apparatus of claim 1 wherein the metal sheet element is a braid.

11. The apparatus of claim 1 wherein the metal sheet element is a mesh.

12. The apparatus of claim 5 wherein the blanket is formed of nine copper sheets, one sheet of one-ply of graphite fiber and three sheets of three-ply graphite fiber.

13. The apparatus of claim 1 wherein the blanket is encased within a cover of polytetrafluoroethylene.

14. The apparatus of claim 1 wherein the heat source includes a silicone rubber heat blanket in thermal contact with the blanket.

15. The apparatus of claim 1 wherein the graphite fiber element is woven.

16. The apparatus of claim 1 wherein the graphite fiber element is not bonded.

17. A method for repairing an aircraft structure repairable with the use of heat, comprising the steps of:

placing a blanket of at least one graphite fiber element and at least one metal sheet element in thermal contact with the aircraft structure to be repaired; and placing a heat source in thermal contact with the blanket and heating the blanket and aircraft structure with the heat source, the blanket transferring heat into the aircraft structure to ensure a uniform temperature in the aircraft structure for repair.

18. The method of claim 17 comprising the step of removing the blanket and heat source from the aircraft structure after the repair.

19. The method of claim 17 wherein the metal sheet element is a copper sheet element.

20. The method of claim 17 further comprising the step of heating the aircraft structure to a temperature range of 250 to 700° F.

* * * * *